US012576761B2

(12) United States Patent
Ive et al.

(10) Patent No.: US 12,576,761 B2
(45) Date of Patent: Mar. 17, 2026

(54) SEAT FOR A VEHICLE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Luca Dusini, Modena (IT); Marcello Pergola, Modena (IT)

(73) Assignee: FERRARI S.P.A., Modena (IT)

( * ) Notice: Subject to any disclaimer, the term of this patent is extended or adjusted under 35 U.S.C. 154(b) by 192 days.

(21) Appl. No.: 18/498,585

(22) Filed: Oct. 31, 2023

(65) Prior Publication Data

US 2024/0149765 A1 May 9, 2024

(30) Foreign Application Priority Data

Nov. 4, 2022 (IT) ........................ 102022000022740

(51) Int. Cl.
*B60N 2/60* (2006.01)
*A47C 31/00* (2006.01)

(52) U.S. Cl.
CPC .......... *B60N 2/6018* (2013.01); *A47C 31/003* (2013.01)

(58) Field of Classification Search
CPC ................................................... B60N 2/6018
See application file for complete search history.

(56) References Cited

U.S. PATENT DOCUMENTS 9,845,033 B1 * 12/2017 Umlauf ............... B60N 2/6018
2008/0061610 A1 3/2008 Tache
(Continued)

FOREIGN PATENT DOCUMENTS

CN 113103567 A 7/2021
DE 102017118157 A1 2/2018
(Continued)

OTHER PUBLICATIONS

European Search Report of European Patent Application No. 23206641.5, Date of Mailing: Feb. 26, 2024, 8 pages.
(Continued)

*Primary Examiner* — Anthony D Barfield
(74) *Attorney, Agent, or Firm* — CANTOR COLBURN LLP

(57) ABSTRACT

A seat for a vehicle having: a base structure configured to be fixed to a floorboard of the vehicle; a cover, which is fixed on top of the base structure, covers the base structure and constitutes the outer part of the seat; and a series of connection devices of magnetic type, each of which has a first body, which is integral with the base structure, and a second body, which is integral with the cover and is configured to be firmly joined to the first body.

7 Claims, 3 Drawing Sheets

(56)　　　　　　References Cited

U.S. PATENT DOCUMENTS

2019/0039489 A1*　2/2019　Fang .................... B60N 2/6036
2019/0143863 A1　　5/2019　O'Hara et al.
2019/0193613 A1　　6/2019　Furuuchi et al.

FOREIGN PATENT DOCUMENTS

FR　　　　2989331 A1　10/2013
JP　　　　H11113690 A　　4/1999

OTHER PUBLICATIONS

Italian Search Report for Application No. 202200022740 ; Filing
Date: Nov. 4, 2022; Date of Mailing: May 9, 2023; 6 pages.

* cited by examiner

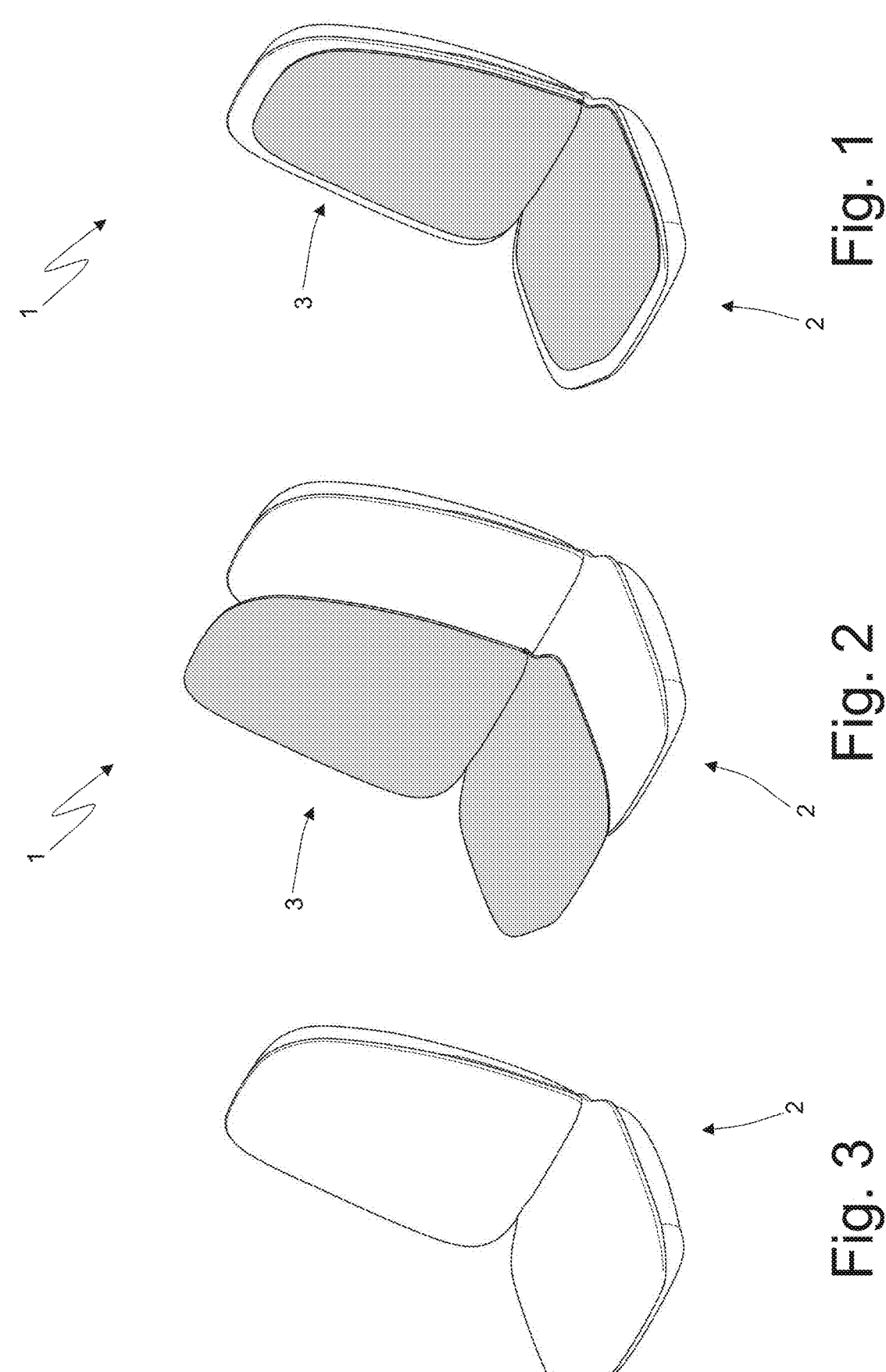

SEAT FOR A VEHICLE

CROSS-REFERENCE TO RELATED APPLICATIONS

This patent application claims priority from Italian patent application no. 102022000022740 filed on Nov. 4, 2022, the entire disclosure of which is incorporated herein by reference.

TECHNICAL FIELD

The present invention relates to a seat for a vehicle.

PRIOR ART

The seat of a vehicle is composed of a seating space (cushion) having a substantially horizontal arrangement and of a backrest having a substantially vertical arrangement.

Seats are one of the elements of the vehicle which most affect the comfort of the passengers, as they constitute the interface through which the passengers enter into physical contact with the vehicle. Currently, seats are designed pursuing the best compromise possible for satisfying a wide range of passenger sizes and a wide range of driving conditions (for example, comfortableness should be favoured when driving for a long journey on roads open to the public, whereas containment should be favoured when driving on track); consequently, seats allow almost all people to obtain a good (or in some cases acceptable) comfort level in all driving conditions, but they are unlikely to allow people to obtain a high comfort level in all driving conditions.

Patent application no. JPH11113690A describes a structure for mounting a seat cover on a main body of a seat of a vehicle; first magnet clips are mounted near a peripheral edge of the main body of the seat and inside a groove formed on the surface of the main body of the seat, and corresponding second magnet clips are mounted on the inner face of the seat cover.

Patent application no. US2008061610A1 describes a cover for a seat portion of an automobile comprising a panel engageable with an attachment mechanism mounted on the upholstery layer of the seat.

DESCRIPTION OF THE INVENTION

The object of the present invention is to provide a seat for a vehicle which allows offering a high comfort to all the occupants and in all driving conditions.

According to the present invention, a seat for a vehicle is provided, according to what is claimed by the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting example embodiment thereof:

FIG. 1 is a perspective view of a seat for a vehicle manufactured in accordance with the present invention;

FIG. 2 is a partially exploded perspective view of the seat of FIG. 1;

FIG. 3 is a perspective view of a base structure of the seat of FIG. 1;

PREFERRED EMBODIMENTS OF THE INVENTION

Figure 4:
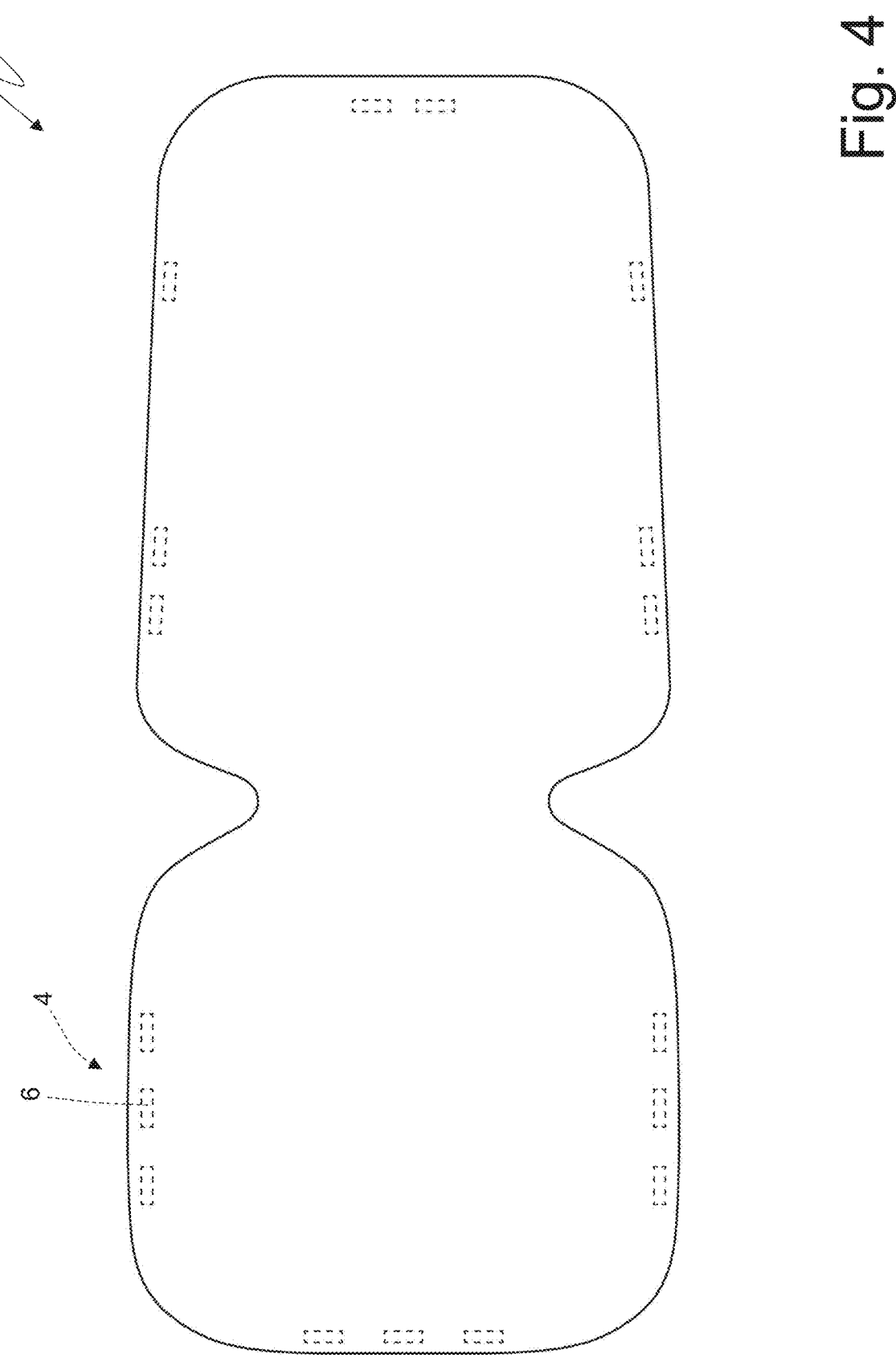
FIG. 4 is a plan view of a cover of the seat of FIG. 1.

In FIGS. 1 and 2, reference numeral 1 indicates, as a whole, a seat for a vehicle.

The seat 1 is divided into a seating space (cushion) having a substantially horizontal arrangement and into a backrest having a substantially vertical arrangement; together, the seating space and the backrest give the seat 1 an "L" shape. The backrest ends at the top with a headrest which is integrated with the backrest (i.e. forms a single indivisible body with the backrest).

From a constructive point of view, the seat 1 comprises a base structure 2 (better illustrated in FIG. 2) configured to be fixed to a floorboard of the vehicle and a cover 3 (illustrated in FIGS. 1, 2 and 4) which is fixed on top of the base structure 2, covers the base structure 2 and constitutes the outer part of the seat 1, i.e. constitutes the aesthetic and tactile interface with the outside.

Figure 5:
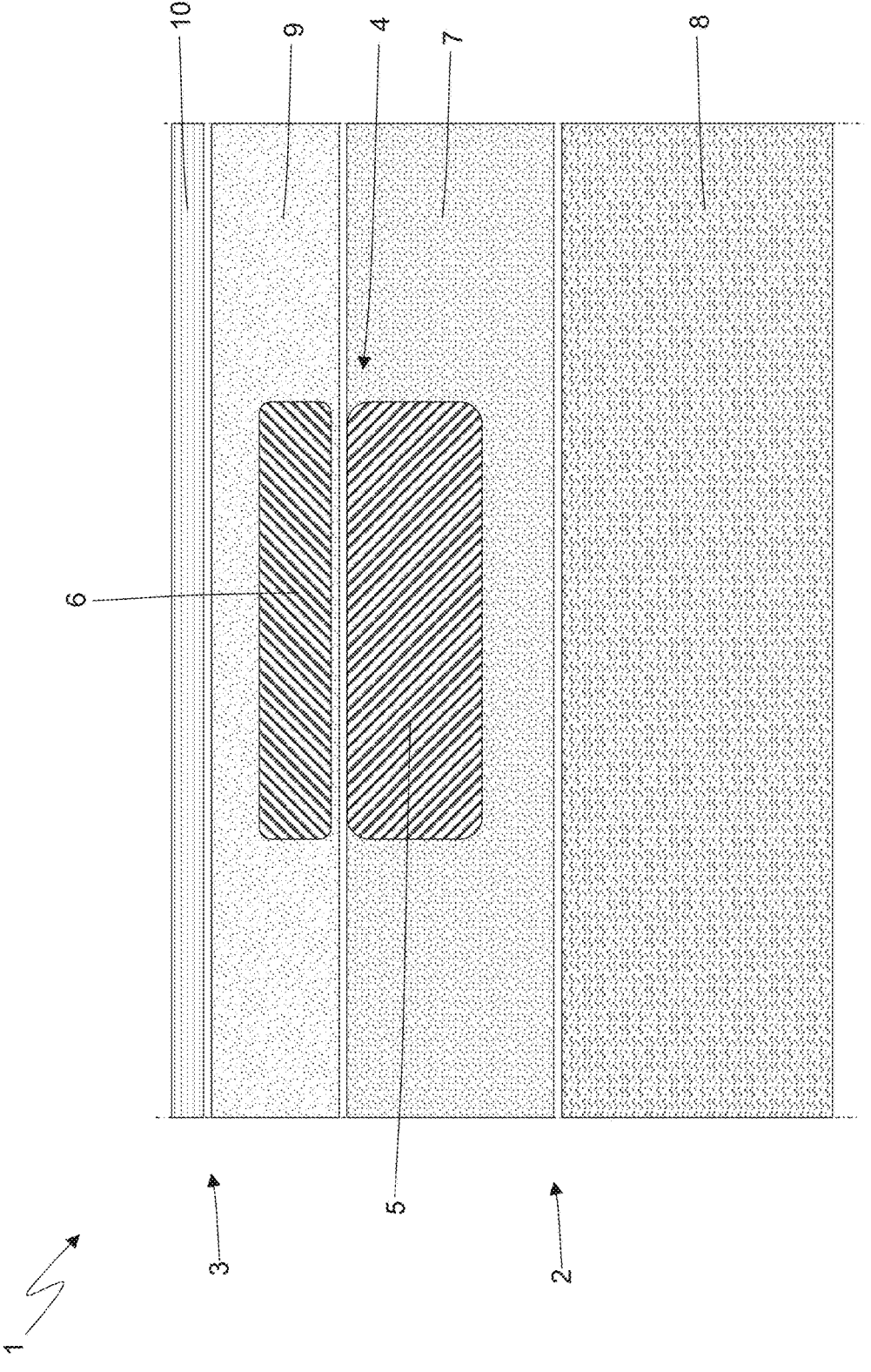
FIG. 5 is a section view of part of the seat of FIG. 1.

According to what is illustrated in FIGS. 4 and 5, the cover 3 is connected to the base structure 2 through a series of connection devices 4 which are distributed along the outer edge of the cover 3, i.e. are arranged along the periphery of the outer edge of the cover 3 (as is illustrated in FIG. 4).

As is better illustrated in FIG. 5, each connection device 4 is of magnetic type (i.e. entails a magnetic coupling creating the joining force through magnetic attraction) and comprises a body 5 integral with the base structure 2 and a body 6 integral with the cover 3 and configured to be magnetically attracted by the body 5. According to a possible embodiment, in each connection device 4 both bodies 5 and 6 are permanent magnets (obviously with opposite magnetic poles for attracting one another). According to an alternative embodiment, only one of the two bodies 5 and 6 is a permanent magnet, whereas the other of the two bodies 5 and 6 is a piece of ferromagnetic metal.

According to a preferred embodiment, in each connection device 4 the body 5 integral with the base structure 2 is larger (and thus heavier) than the body 6 integral with the cover 3 so as to reduce the overall weight of the cover 3 maintaining a suitable attractive force between the cover 3 and the base structure 2. In other words, in each connection device 4, instead of manufacturing two bodies 5 and 6 having equal mass, mass is shifted on the body 5 integral with the base structure 2 so as to reduce the mass of the body 6 integral with the cover 3.

According to a possible embodiment, in each connection device 4, a thin layer of non-ferromagnetic material is always interposed between the two bodies 5 and 6, so as to prevent a direct contact between the two bodies 5 and 6 and thus prevent a "magnetic gluing", i.e. prevent the two bodies 5 and 6 from joining with a magnetic attractive force which is too strong and which becomes difficult to overcome when it is necessary to remove the cover 3.

According to what is illustrated in FIG. 5, an outer part of the base structure 2 (i.e. the part of the base structure 2 facing the cover 3) comprises two different bearing layers 7 and 8: an elastically deformable bearing layer 7 which is arranged on the outside and is in direct contact with the cover 3, and an elastically deformable bearing layer 8 which is arranged on the inside in contact with the bearing layer 7.

According to what is illustrated in FIG. 5, the cover 3 comprises an elastically deformable bearing layer 9 which is arranged on the inside (i.e. in direct contact with the base structure 2) and a finishing layer 10 which is arranged on the outside and is made, for example, of leather, of Alcantara or of any other material suitable for the contact with the body of the passenger sitting in the seat 1.

The sole function of the finishing layer 10 of the cover 3 is to provide a pleasant tactile feeling and to present a likeable aspect. Whereas, the function of the bearing layer 9 of the cover 3 and of the two bearing layers 7 and 8 of the base structure 2 is to provide a suitable support for the passenger sitting in the seat 1. The bearing layer 9 of the cover 3 and the two bearing layers 7 and 8 of the base structure 2 are preferably made of a solid foam and have differentiated stiffnesses; in particular, the bearing layer 9 of the cover 3 has a smaller stiffness than a stiffness of the bearing layer 7 of the base structure 2, and in turn the bearing layer 7 of the base structure 2 has a smaller stiffness than a stiffness of the bearing layer 8 of the base structure 2. Namely, the stiffness increases progressively from the outside (i.e. from the bearing layer 9 of the cover 3) towards the inside (i.e. towards the bearing layer 7 of the base structure 2).

According to a possible embodiment, the bearing layer 9 of the cover 3 can be manufactured through additive manufacturing (i.e. 3D printing) and thus the bearing layer 9 of each cover 3 can be manufactured differently from all the bearing layers 9 of the other covers 3 (i.e. the bearing layer 9 of the cover 3 is completely customizable). According to a preferred embodiment, the bearing layer 9 of the cover 3 has a reticular conformation (i.e. the bearing layer 9 is reticular); in particular, the bearing layer 9 of the reticular cover 3 is constructed by means of the joint of uprights according to specially provided geometrical schemes, mainly of pyramid type. Namely, the bearing layer 9 of the reticular cover 3 is made of a solid foam having a reticular structure.

Subsequent to the manufacturing of the bearing layer 9 of the reticular cover 3 through additive manufacturing, the finishing layer 10 is applied (for example, glued) to the bearing layer 9 of the cover 3.

According to the preferred embodiment illustrated in the accompanying figures, the connection devices 4 are of magnetic type. According to other embodiments, the connection devices 4 are of another type; for example, the connection devices 4 are of mechanical type and utilize an interference (i.e. an elastic deformation) or a screwing for creating the coupling.

It is important to highlight that the seat 1 can be a single seat arranged in a front or rear position (as is illustrated in the accompanying figures) or can be a double or triple seat arranged in a rear position; in this case, preferably the seat 1 comprises a single base structure 2 which receives two or three different covers 3.

The embodiments described herein can be combined with one another without departing from the scope of protection of the present invention.

The above-described seat 1 has numerous advantages.

Firstly, the above-described seat 1 allows offering a high comfort to all the occupants, i.e. to all the passengers utilizing the seat 1, and in all driving conditions. This result is obtained since a base structure 2 which is firmly fixed to the floorboard of the vehicle is utilized and it is common to all the passengers utilizing the seat 1 and in all driving conditions (i.e. it remains always the same for all passengers utilizing the seat 1 and in all driving conditions) and a cover 3 which is (easily and rapidly) replaceable and thus can be customized for each passenger utilizing the seat 1 also depending on the driving conditions. In other words, it is possible to manufacture, for each passenger utilizing the seat 1 and for each driving condition, a corresponding customized cover 3 which is designed (customized) on the basis of the anthropometric characteristics of the passenger and on the basis of the driving conditions so as to offer the maximum comfort possible to the passenger. Namely, the above-described seat 1 is widely customizable for adapting to the actual anthropometric characteristics of the final user and to the actual driving conditions (therefore, a same passenger can have two different covers 3 for the journeys on roads open to the public and for the driving on track).

Furthermore, the above-described seat 1 also allows quickly varying the aesthetic aspect of the seats 1 allowing the owner of the vehicle to vary, in a substantial manner and at a relatively modest cost, the aesthetic aspect of the passenger compartment also years after purchasing the vehicle. Besides, the cover 3 is the only part of the seat 1 which is subject to a remarkable wear also in a relatively short time and thus the possibility to replace the cover 3 in an easy and cost-effective manner allows having a passenger compartment which is always "new".

Finally, the above-described seat 1 can be manufactured in a relatively simple and quick manner by utilizing a commercial three-dimensional printer for the production of the covers 3.

LIST OF THE REFERENCE NUMERALS OF
THE FIGURES

1 seat
2 base structure
3 cover
4 connection devices
5 body
6 body
7 bearing layer
8 bearing layer
9 bearing layer
10 finishing layer

The invention claimed is:

1. A seat (1) for a vehicle comprising:
a base structure (2) configured to be fixed to a floorboard of the vehicle;
a cover (3), which is fixed on top of the base structure (2), covers the base structure (2) and constitutes the outer part of the seat (1); and
a series of connection devices (4), which are distributed along an outer edge of the cover (3) and connect the cover (3) to the base structure (2);
wherein each connection device (4) comprises a first body (5), which is integral with the base structure (2), and a second body (6), which is integral with the cover (3) and is configured to be firmly joined to the first body (5);
wherein the cover (3) comprises an elastically deformable bearing layer (9), which is arranged on the inside in direct contact with the base structure (2), and a finishing layer (10), which is arranged on the outside;
wherein the bearing layer (9) of the cover (3) has a reticular structure and can be manufactured through additive manufacturing;
wherein an outer part of the base structure (2) comprises at least one elastically deformable bearing layer (7, 8), which has a greater stiffness than a stiffness of the bearing layer (9) of the cover (3);
wherein the outer part of the base structure (2) comprises a first elastically deformable bearing layer (7), which is arranged on the outside and is in direct contact with the cover (3), and a second elastically deformable bearing layer (8), which is arranged on the inside in contact with the first bearing layer (7); and wherein the first bearing layer (7) of the base structure (2) has a smaller stiffness than a stiffness of the second bearing layer (8) of the base structure (2).

2. The seat (1) according to claim 1, wherein each connection device (4) entails a magnetic coupling creating the joining force through magnetic attraction and therefore, in each connection device (4), the second body (6) is configured to be magnetically attracted by the first body (5).

3. The seat (1) according to claim 2, wherein, in each connection device (4), both bodies (5, 6) are permanent magnets with opposite magnetic poles to attract one another.

4. The seat (1) according to claim 2, wherein, in each connection device (4), the first body (5) integral with the base structure (2) is larger, namely has a larger mass, than the second body (6) integral with the cover (3).

5. The seat (1) according to claim 2, wherein, in each connection device (4), a layer of non-ferromagnetic material is always interposed between the two bodies (5, 6).

6. The seat (1) according to claim 1, wherein each connection device (4) entails a mechanical coupling between the two bodies (5, 6).

7. The seat (1) according to claim 1, wherein the bearing layer (9) of the cover (3) is made of a solid foam.

* * * * *